(12) United States Patent
Nagy et al.

(10) Patent No.: US 7,026,415 B2
(45) Date of Patent: Apr. 11, 2006

(54) CLATHROCHELATES AS OLEFIN POLYMERIZATION CATALYST COMPONENTS

(75) Inventors: Sandor Nagy, Naperville, IL (US); Barbara M. Tsuie, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 163 days.

(21) Appl. No.: 10/779,939

(22) Filed: Feb. 17, 2004

(65) Prior Publication Data

US 2005/0182211 A1 Aug. 18, 2005

(51) Int. Cl.
*C08F 4/12* (2006.01)
*C08F 4/26* (2006.01)
*C08F 4/52* (2006.01)

(52) U.S. Cl. ............ 526/172; 526/161; 526/134; 526/169.1; 526/148; 526/153; 526/169

(58) Field of Classification Search .......... 526/170, 526/172, 160, 161, 134, 148, 153, 169, 169.1
See application file for complete search history.

(56) References Cited

U.S. PATENT DOCUMENTS

| | | | | |
|---|---|---|---|---|
| 4,257,955 | A | * | 3/1981 | Gansow et al. ........... 540/465 |
| 4,705,849 | A | * | 11/1987 | Nunn et al. ............. 424/1.65 |
| 4,714,605 | A | * | 12/1987 | Feld et al. .............. 424/1.65 |
| 4,871,836 | A | * | 10/1989 | Francesconi et al. ....... 534/10 |
| 5,118,797 | A | * | 6/1992 | Jurisson et al. ........... 534/10 |
| 5,198,401 | A | | 3/1993 | Turner et al. ............. 502/155 |
| 5,241,025 | A | | 8/1993 | Hlatky et al. ............. 526/129 |
| 5,414,180 | A | | 5/1995 | Geerts et al. ............. 585/525 |
| 5,432,101 | A | * | 7/1995 | Mathis et al. ............ 436/546 |
| 5,648,440 | A | | 7/1997 | Sugano et al. ............ 526/132 |
| 6,211,311 | B1 | | 4/2001 | Wang et al. .............. 526/131 |
| 6,559,327 | B1 | | 5/2003 | Gridnev et al. ............. 556/35 |
| 6,642,195 | B1 | * | 11/2003 | Hage ..................... 510/311 |
| 6,906,189 | B1 | * | 6/2005 | Busch et al. ............. 540/465 |

OTHER PUBLICATIONS

Y. Voloshin, *Polyhedron 17* (1998) 4315.
Y. Voloshin et al., *Clathrochelates; Synthesis, Structure and Properties*, Chapters 1-2, Elsevier (2002).
*Koord, Khim.* 4 (1978) 1391.
U. Zucchini et al., *J. Organometal.Chem. 26* (1971) 357.
D. Boston et al., *J. Am. Chem. Soc. 90:24* (1968) 6859.
J. Facker, Jr., *Inorganic Syntheses 21* (1982) 112.
A. Macdiarmid, *Inorganic Syntheses 17* 139.
D. Boston et al., *J. Am. Chem. Soc. 95:13* (1973) 4163.
M. Robbins et al., *Inorg. Chem. 24* (1985) 3381.
Y. Voloshin et al., *Inorg. Chem. 39* (2000) 1907.
Y. Voloshin et al., *Journal of Organometallic Chemistry 536-537* (1997) 207.
J. Muller et al., *Inorg. Chem. 25* (1986) 2665.
J. Parks et al., *Inorganic Chemistry 10* (1971) 2472.
Y. Voloshin et al., *J. Chem. Soc. Dalton Trans.* (2002) 1193.

* cited by examiner

*Primary Examiner*—David W. Wu
*Assistant Examiner*—Rip A. Lee
(74) *Attorney, Agent, or Firm*—Jonathan L. Schuchardt

(57) ABSTRACT

Catalyst systems and methods for olefin polymerization are disclosed. The polymerizations are performed in the presence of a clathrochelate which comprises a transition metal ion and an encapsulating macropolycyclic ligand. At least one of the capping atoms of the macropolycyclic ligand is a Group 3–10 transition metal or a Group 13 atom. When a capping atom is a Group 3–10 transition metal, the clathrochelate can be used with an activator to polymerize olefins. When a capping atom is a Group 13 atom, the clathrachelate can be used as an activator for an olefin polumerization. Clathrochelates allow polyolefin markers to fine tune catalyst reactivity and polyolefin properties.

21 Claims, No Drawings

CLATHROCHELATES AS OLEFIN POLYMERIZATION CATALYST COMPONENTS

FIELD OF THE INVENTION

The invention relates to catalysts useful for olefin polymerization. In particular, the invention relates to clathrochelates and their use as components of olefin polymerization catalysts and activators.

BACKGROUND OF THE INVENTION

The polyolefins industry continues to look for new and better catalyst systems. Ziegler-Natta catalysts are a mainstay, but single-site (metallocene and non-metallocene) catalysts are making inroads. Among other benefits, single-site catalysts can provide polymers with narrow molecular weight distribution, reduced low molecular weight extractables, and enhanced incorporation of α-olefin comonomers. Traditional metallocenes incorporate one or more cyclopentadienyl (Cp) or Cp-like anionic ligands such as indenyl, fluorenyl, or the like, that donate pi-electrons to a central transition metal. In other non-metallocene single-site catalysts, such as the pyridyl bis(imine) complexes, ligands chelate to the metal through two or more electron donor atoms.

"Clathrochelates" are intriguing compounds in which a transition metal ion is encapsulated within the cavity of a three-dimensional, macropolycyclic ligand. The encapsulated ions, because they are largely sequestered, offer unique properties and chemistry, including interesting redox characteristics and an opportunity to mimic important biological systems. One common type of clathrochelate is an iron(II) tris(dioximate). These are made in one step or sequentially by reacting $FeCl_2$ with three equivalents of a dioxime (nioxime, glyoxime, dimethylglyoxime, or the like) in the presence of two equivalents of a capping reagent ($SnBr_4$ or phenylboronic acid, for example). See, e.g., *Polyhedron* 17 (1998) 4315.

Despite their obvious complexity, clathrochelates have a high degree of symmetry, and useful synthetic routes have been developed, many by Professor Yan Voloshin and coworkers. A recently published monograph, Voloshin et al., *Clathrochelates: Synthesis, Structure and Properties*, Elsevier, 2002, provides a comprehensive overview of work in this field and includes hundreds of references to the primary literature.

Voloshin defines clathrochelates as three-dimensional complexes in which an encapsulated metal ion coordinates five or more nitrogen or sulfur donor atoms of an encapsulating ligand that has at least three macrocyclic fragments. The macrocyclic fragments share at least two capping atoms (also called "bridgehead" or "apical" atoms), which are commonly carbon, but can also be transition metals (e.g., Sn, Sb, Mn), silicon, boron, or other atoms. Herein, we expand the definition of "clathrochelate" to include complexes in which the encapsulated metal ion coordinates five or more nitrogen, phosphorus, oxygen, or sulfur atoms.

Clathrochelates have apparently not been suggested as components of catalysts for olefin polymerization. On the other hand, the ability to incorporate transition metals and/or Group 13 atoms in the apical (or capping) positions of clathrochelates provides an as-yet unexplored opportunity to use the unique electronics of clathrochelates for tuning an olefin polymerization reaction.

SUMMARY OF THE INVENTION

In one aspect, the invention is a method for polymerizing an olefin. The polymerization is performed in the presence of a clathrochelate which comprises a transition metal ion and a macropolycyclic ligand. The ligand encapsulates the transition metal ion. At least one of the capping atoms of the macropolycyclic ligand is a Group 3–10 transition metal or a Group 13 atom. The invention includes a catalyst system useful for polymerizing olefins. The catalyst system comprises an activator and a clathrochelate as described above in which at least one of the capping atoms is a Group 3–10 transition metal. The invention also includes an activator which comprises an alkylaluminum compound and a clathrochelate as described above in which at least one of the capping atoms of the macropolycyclic ligand is a Group 13 atom.

Clathrochelates provide a unique opportunity for polyolefin makers to fine tune catalyst reactivity and polyolefin properties by judicious choice of the encapsulated transition metal ion (including its oxidation state), the macrocyclic fragments, and in particular, the Group 3–10 transition metal or Group 13 atom that resides at an apex of the clathrochelate.

DETAILED DESCRIPTION OF THE INVENTION

The method of the invention comprises polymerizing an olefin in the presence of a clathrochelate. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are particularly preferred.

Suitable clathrochelates are complexes which comprise a transition metal ion that is encapsulated within the cavity of a three-dimensional macropolycyclic ligand. The encapsulated metal ion coordinates five or more nitrogen, phosphorus, oxygen, or sulfur donor atoms of the macropolycyclic ligand. The ligand has at least three macrocyclic fragments. These fragments share at least two capping atoms. In clathrochelates used in the invention, at least one of the capping atoms is a Group 3 to 10 transition metal or a Group 13 atom.

The transition metal ion that is encapsulated within the clathrochelate can have a variety of oxidation states. Commonly, the oxidation state will be from 1+ to 4+, with 2+ to 3+ being most preferred. The transition metal can be from Groups 3 to 12 (i.e., Sc, Ti, V, Cr, Mn, Fe, Co, Ni, Cu, and Zn and elements below these in the Periodic Table). Preferably, the transition metal ion is Fe, Co, Ni, Cu, Mn, Cr, V, Ti, or Zn. Most preferred are Fe and Co. Particularly preferred are clathrochelates that incorporate $Fe^{2+}$, $Fe^{3+}$, $Co^{2+}$, or $Co^{3+}$ as the transition metal ion.

The macropolycyclic ligand (or "clathrochelant") incorporates three or more nitrogen, phosphorus, oxygen, or sulfur-containing fragments, each of which is usually identical. The electron donor atoms of the fragments coordinate the sequestered transition metal ion in the clathrochelate. A simplified clathrochelate representation appears below:

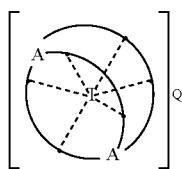

In this sketch, T is the transition metal ion, the arcs represent macrocyclic fragments, the dots are N, P, O, or S atoms, each A is a capping atom, and Q is one or more counterions that balance the overall charge on the clathrochelate. In some complexes, the Q groups could be represented as being bonded to a capping atom; for clarity, however, we show the counterions outside the brackets. Preferably, the ligand is a polyaza-polyazathio-, polythio-, polyoxo-, polyoxothio-, polyazaoxo-, or polyaza-oxothiomacrobicyclic ligand.

A preferred class of clathrochelates is the macrobicyclic tris(dioximates). Tris(dioximates) incorporate three, usually identical moieties derived from a dioxime. Suitable dioxime precursors are glyoxime, methylglyoxime, dimethylglyoxime, nioxime, phenylglyoxime, dichloroglyoxime, and the like. These and numerous other suitable dioximes are described in Voloshin's text (see *Clathrochelates,* supra, especially at p. 8, Scheme 3) and references cited therein. Particularly preferred tris(dioximates) derive from glyoxime, methylglyoxime, phenylglyoxime, or nioxime.

Clathrochelates useful in the invention have a capping atom that is either a Group 3 to 10 transition metal or a Group 13 atom. When at least one capping atom is from Group 13 (e.g., aluminum or boron), the clathrochelate can be used in combination with an alkylaluminum compound to activate an olefin polymerization reaction. When at least one capping atom is a Group 3 to 10 transition metal, the clathrochelate can be used in combination with an activator to catalyze an olefin polymerization. Clathrochelates that incorporate one Group 13 atom and one Group 3 to 10 transition metal atom can be combined with an alkylaluminum compound, alumoxane, or other activator to generate an active catalyst for polymerizing olefins.

Preferred clathrochelates incorporate the same Group 3 to 10 transition metal or the same Group 13 atom at each apical position. In one preferred clathrochelate, both capping atoms are the same Group 4 transition metal, e.g., Ti or Zr. In another preferred clathrochelate, both capping atoms are either boron or aluminum.

Clathrochelates useful in the invention can be prepared by any of a number of well-known methods. See Voloshin et al., *Clathrochelates: Synthesis, Structure and Properties,* and references cited therein for approaches to synthesizing clathrochelates having either a Group 13 atom or a Group 3–10 transition metal, or both, at the apical positions. The synthesis is facilitated by the choice of the same Group 13 atom for each apical position or the choice of the same Group 3 to 10 transition metal for each apical position.

In one convenient approach, the clathrochelate is generated in two steps via a hexahydroxy intermediate complex. For example, simply combining the transition metal ion source (e.g., $FeCl_2$ or $CoCl_3$) with three equivalents of a dioxime in a suitable solvent in the presence of a protic acid generates the desired hydroxy-functional intermediate (see Example 1 below and *Koord. Khim.* 4 (1978) 84; 1391) as an easily isolated precipitate. This intermediate can be combined with a suitable source of a Group 13 atom (e.g., phenylboronic acid or triethylborane) or a Group 3 to 10 transition metal (e.g., titanium tetrabenzyl) to produce the desired clathrochelate. See Examples 2 and 3 below.

One preferred class of clathrochelates useful in the invention has the structure:

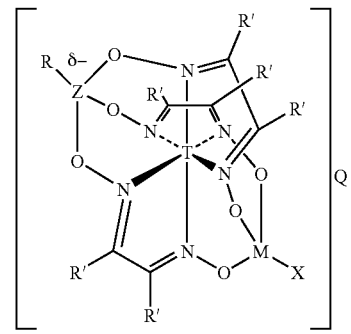

in which T is a transition metal ion, M is a Group 4 transition metal, X is a halide, Z is boron or aluminum, R is a halide, alkyl, aryl, or aralkyl group, each R' is independently hydrogen or an alkyl, aryl, or aralkyl group or hydrocarbyl radicals joined to form a five or six-membered ring, and Q is one or more counterions that balance the overall charge on the clathrochelate. Such a clathrochelate, when combined with a suitable activator, is useful as an olefin polymerization catalyst. Two examples of this type:

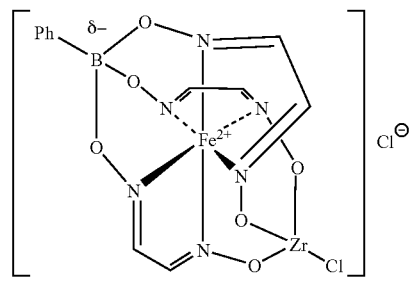

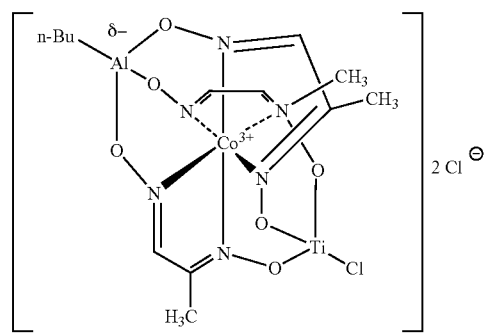

Another preferred class of clathrochelates useful in the invention has the structure:

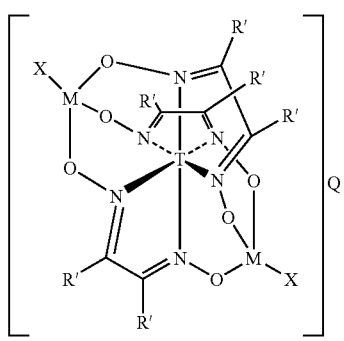

in which T, M, X, R', and Q have the meanings defined earlier. Such a clathrochelate, when combined with an activator, is useful for polymerizing olefins. Two examples of this type of clathrochelate:

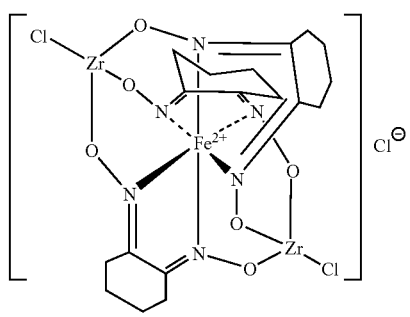

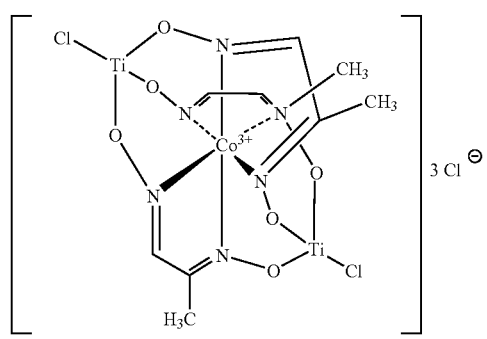

Another preferred class of clathrochelates useful in the invention has the structure:

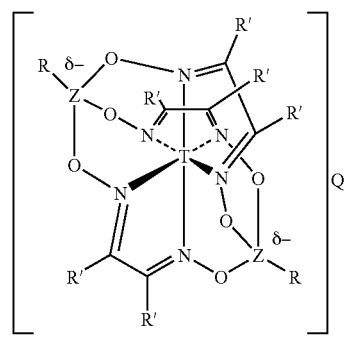

in which T, Z, R, R', and Q have the meanings defined earlier. Such clathrochelates, when combined with an alkylaluminum compound, are valuable activators for olefin polymerizations. Two examples:

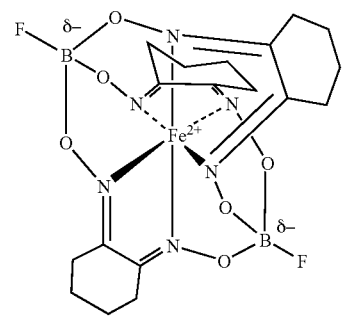

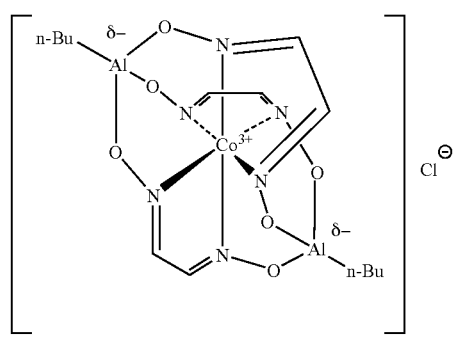

Note that a counterion is not always needed to provide a charge-balanced complex; the first of the two structures immediately above illustrates this point. Thus, when a counterion is not needed to give a neutral complex, Q is optional.

The clathrochelates are preferably used with an activator, which helps to ionize the Group 3 to 10 transition metal complex, alkylate the Group 13 atom, or otherwise activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain nonnucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis (penta-fluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The optimum amount of activator needed relative to the amount of clathrochelate depends on many factors, including the nature of the clathrochelate and activator, whether a supported catalyst is used, the desired reaction rate, the kind of polyolefin product, the reaction conditions, and other factors. The activator is normally added to the reaction mixture at the start of the polymerization. However, when a supported catalyst system is used, the activator can be deposited onto the support along with the organometallic complex.

The clathrochelate and activator are optionally used with an inorganic solid or organic polymer support. Suitable supports include silica, alumina, silica-aluminas, magnesia, titania, clays, zeolites, or the like. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

The clathrochelate and other components can be deposited on the support in any desired manner. For instance, the components can be dissolved in a solvent, combined with a support, and stripped. Alternatively, an incipient-wetness technique can be used. Moreover, the support can simply be introduced into the reactor separately from the clathrochelate and other components.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The olefin polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psig to about 50,000 psig. More preferred is the range from about 15 psig to about 1000 psig.

The following examples merely illustrate the invention. Those skilled in the art will recognize many variations that are within the spirit of the invention and scope of the claims.

EXAMPLE 1

Preparation of a Hexahydroxy Intermediate

A side-arm flask is charged with $FeCl_2$ (1.00 g, 7.95 mmol), 1,2-cyclohexanedione dioxime ("nioxime") (3.37 g, 23.7 mmol), and anhydrous, degassed ethanol (about 80 mL) to afford a red slurry. Hydrochloric acid (12 N, 3 drops) is added to dissolve all solids. Red crystals precipitate within one minute. The mixture is kept at room temperature for 2 h and then filtered. The solids are washed with hexane (100 mL) and dried under vacuum (yield: 3.22 g, 73%). $^1H$ NMR results are consistent with the proposed structure (1).

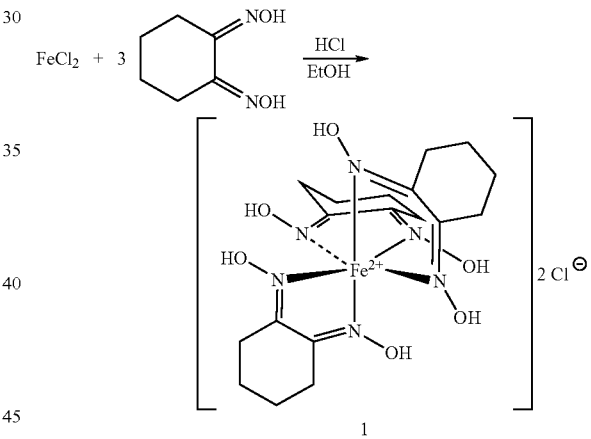

EXAMPLE 2

Preparation of a Clathrochelate with Titanium Capping Atoms (1:1)

A solution of titanium tetrabenzyl (0.16 g, 0.38 mmol, prepared according to the method of Zucchini et al., *J. Organometal. Chem.* 26 (1971) 357) in toluene (20 mL) is cooled to −78° C., and a solution of the hexahydroxy intermediate from Example 1 (0.21 g, 0.38 mmol) in toluene (20 mL) is added by cannula under nitrogen. The mixture warms to room temperature overnight. Volatiles are removed under vacuum to afford a red-purple residue (0.21 g, 77%). The $^1H$ NMR spectrum ($CD_2Cl_2$) of a filtered sample indicates the presence of cyclohexyl, benzyl, and hydroxyl groups and is consistent with a mixture that contains predominantly semi-clathrochelate 2, although hexahydroxy compound 1 and clathrochelate 3 are also likely to be present.

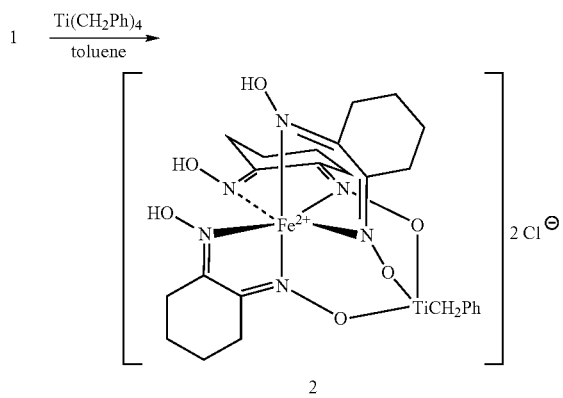

EXAMPLE 3

Preparation of a Clathrochelate with Titanium Capping Atoms (2:1)

A solution of 1 (0.16 g, 0.29 mmol) in toluene (50 mL) is added dropwise to a chilled (−78° C.) solution of titanium tetrabenzyl (0.24 g, 0.58 mmol) in toluene (20 mL) under nitrogen. The mixture turns red-black and warms to room temperature overnight. Volatiles are removed under vacuum to give a dark red-purple solid (0.15 g, 61%). The $^1$H NMR spectrum (CD$_2$Cl$_2$) of a filtered sample shows the presence of cyclohexyl and benzyl groups, but no free hydroxyl groups. This is most consistent with clathrochelate 3 as the principal product.

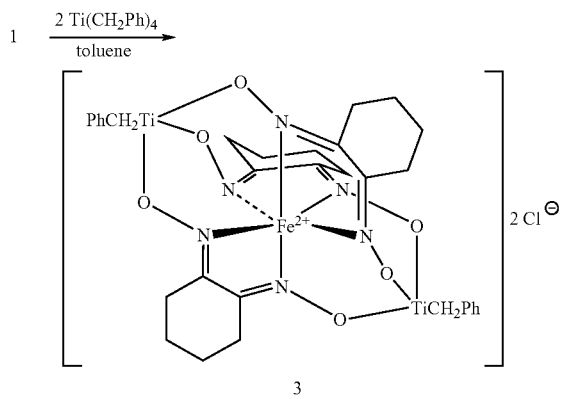

EXAMPLE 4

Preparation of Supported Complex and Ethylene Polymerization

Methylalumoxane (product of Albemarle, 0.23 mL of 1.4 M solution in toluene) is slowly added to a stirred bed of ES-757 silica (product of Ineos, dried at 250° C. under nitrogen, 1.0 g). After 15 min., a deep purple solution containing the clathrochelate mixture from Example 2 (10 mg) and MAO/toluene solution (0.46 mL of 4.14 M solution) is slowly added to the MAO-treated silica at room temperature, and the mixture is stirred for 30 min.

A two-liter reactor is charged with isobutane (1.0 L), 1-butene (10 mL), and triisobutylaluminum (1.0 mL of 1 M solution in toluene). The contents are heated to 75° C., and the free-flowing, silica-supported titanium clathrochelate complex prepared above is added. The reactor is pressurized with ethylene to 350 psig. Ethylene is supplied on demand at 350 psig for 1 h at 75° C. The reactor is then vented and cooled to ambient temperature. About 10 g of high-molecular-weight polyethylene is obtained.

The preceding examples are meant only as illustrations. The following claims define the invention.

What is claimed is:

1. A method which comprises polymerizing an olefin in the presence of a clathrochelate which comprises:
    (a) a transition metal ion; and
    (b) a macropolycyclic ligand that encapsulates the transition metal ion;
    wherein the macropolycyclic ligand has at least three macropolycyclic fragments that share at least two capping atoms, at least one of the capping atoms is a Group 3–10 transition metal or a Group 13 atom, and the transition metal ion is coordinated to five or more nitrogen, phosphorus, oxygen, or sulfur atoms of the macropolycyclic ligand.

2. The method of claim 1 wherein the ligand is selected from the group consisting of polyaza-, polyazathio-, polythio-, polyoxo-,polyoxothio-, polyazaoxo-, and polyazaoxothiomacrobicyclic ligands.

3. The method of claim 1 wherein the clathrochelate is a tris(dioximate).

4. The method of claim 1 wherein the capping atoms are Group 4 transition metals.

5. The method of claim 1 further comprising an activator.

6. The method of claim 1 wherein the capping atoms are Group 13 atoms, and the clathrochelate is used in combination with an olefin polymerization catalyst.

7. The method of claim 6 wherein the polymerization is performed in the presence of an alkylaluminum compound.

8. The method of claim 1 wherein the transition metal ion is selected from the group consisting of Fe$^{2+}$ and Co$^{3+}$.

9. The method of claim 1 wherein the Group 13 atom is boron, aluminum, or a combination of these.

10. The method of claim 1 wherein the clathrochelate has the structure:

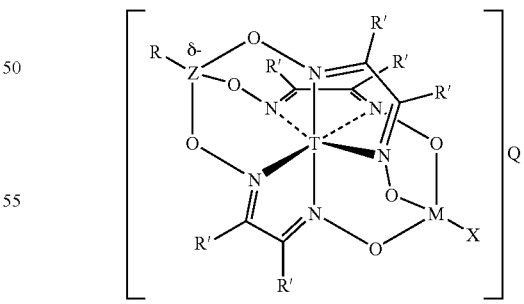

wherein T is a transition metal ion, M is a Group 4 transition metal, X is a halide, Z is boron or aluminum, R is a halide, alkyl, aryl, or aralkyl group, each R' is independently hydrogen or an alkyl, aryl, or aralkyl group or hydrocarbyl radicals joined to form a five or six-membered ring, and Q is one or more counterions that balance the overall charge on the clathrochelate.

11. The method of claim 4 wherein the clathrochelate has the structure:

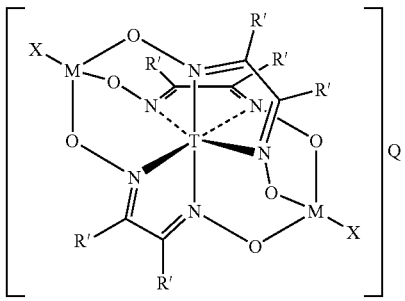

wherein T is a transition metal ion, M is a Group 4 transition metal, X is a halide, each R' is independently hydrogen or an alkyl, aryl, or aralkyl group or hydrocarbyl radicals joined to form a five or six-membered ring, and Q is one or more counterions that balance the overall charge on the clathrochelate.

12. The method of claim 6 wherein the clathrochelate has the structure:

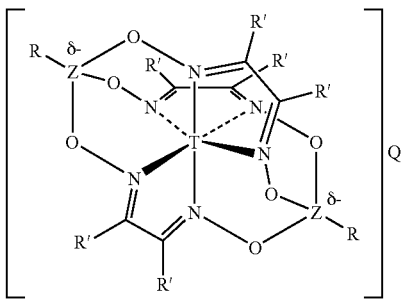

wherein T is a transition metal ion, Z is boron or aluminum, R is a halide, alkyl, aryl, or aralkyl group, each R' is independently hydrogen or an alkyl, aryl, or aralkyl group or hydrocarbyl radicals joined to form a five or six-membered ring, and Q is one or more counterions that balance the overall charge on the clathrochelate.

13. A catalyst system useful for polymerizing olefins, said catalyst system comprising an activator and a clathrochelate, wherein the clathrochelate comprises:
(a) a transition metal ion; and
(b) a macropolycyclic ligand that encapsulates the transition metal ion;
wherein the macropolycyclic ligand has at least three macropolycyclic fragments that share at least two cappina atoms, at least one of the capping atoms is a Group 3–10 transition metal, and the transition metal ion is coordinated to five or more nitrogen, phosphorus, oxygen, or sulfur atoms of the macropolycyclic ligand.

14. The catalyst system of claim 13 wherein the clathrochelate is a tris(dioximate).

15. The catalyst system of claim 13 wherein the transition metal ion is selected from the group consisting of $Fe^{2+}$ and $Co^{3+}$.

16. The catalyst system of claim 13 wherein the activator is selected from the group consisting of alumoxanes, alkylaluminum compounds, aluminoboronates, organoboranes, ionic borates, and ionic aluminates.

17. The catalyst system of claim 13 wherein at least one of the capping atoms is zirconium.

18. The catalyst system of claim 13 wherein the clathrochelate has the structure:

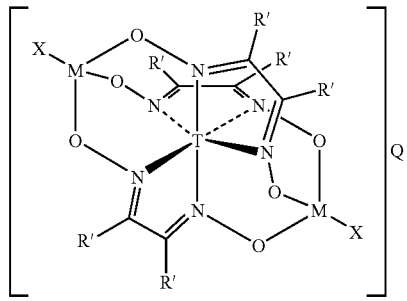

wherein T is a transition metal ion, M is a Group 4 transition metal, X is a halide, each R' is independently hydrogen or an alkyl, aryl, or aralkyl group or hydrocarbyl radicals joined to form a five or six-membered ring, and Q is one or more counterions that balance the overall charge on the clathrochelate.

19. An activator for olefin polymerization reactions, said activator comprising an alkylaluminum compound and a clathrochelate, wherein the clathrochelate comprises:
(a) a transition metal ion; and
(b) a macropolycyclic ligand that encapsulates the transition metal ion;
wherein the macropolycyclic ligand has at least three macropolycyclic fragments that share at least two capping atoms, at least one of the capping atoms is a Group 13 atom, and the transition metal ion is coordinated to five or more nitrogen, phophorus, oxygen, or sulfur atoms of the macropolycyclic ligand.

20. The activator of claim 19 wherein the capping atoms are Group 13 atoms.

21. The activator of claim 20 wherein the clathrochelate has the structure:

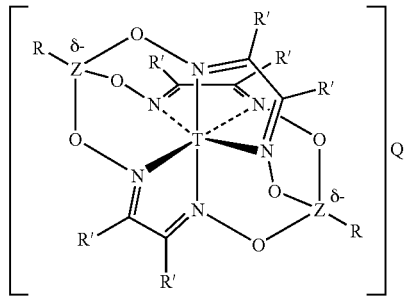

wherein T is a transition metal ion, Z is boron or aluminum, R is a halide, alkyl, aryl, or aralkyl group, each R' is independently hydrogen or an alkyl, aryl, or aralkyl group or hydrocarbyl radicals joined to form a five or six-membered ring, and Q is one or more counterions that balance the overall charge on the clathrochelate.

* * * * *